US006992963B2

(12) United States Patent
Kodama

(10) Patent No.: US 6,992,963 B2
(45) Date of Patent: Jan. 31, 2006

(54) SEMICONDUCTOR INTEGRATED CIRCUIT, OPTICAL DISK RECORDING/PLAYBACK APPARATUS USING THE SAME, AND OPTICAL DISK RECORDING METHOD

(75) Inventor: Kunihiko Kodama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 10/307,976

(22) Filed: Dec. 3, 2002

(65) Prior Publication Data

US 2003/0123361 A1    Jul. 3, 2003

(30) Foreign Application Priority Data

Dec. 3, 2001    (JP)    ............................. 2001-368102

(51) Int. Cl.
*G11B 7/00*    (2006.01)

(52) U.S. Cl. ................................. 369/53.34; 369/47.28

(58) Field of Classification Search ............... 369/47.1, 369/275.3, 47.13, 47.16, 47.21, 47.27, 47.26, 369/47.28, 53.34
See application file for complete search history.

(56) References Cited

U.S. PATENT DOCUMENTS 5,748,591 A * 5/1998 Nakai ....................... 369/47.39
6,269,059 B1 * 7/2001 Kuroda et al. ........... 369/47.28

FOREIGN PATENT DOCUMENTS

| JP | 64-001167 | 1/1989 |
|---|---|---|
| JP | 2000-173055 | 6/2000 |
| JP | 2000-357328 | 12/2000 |
| JP | 2001-307433 | 11/2001 |

* cited by examiner

*Primary Examiner*—Nabil Hindi
(74) *Attorney, Agent, or Firm*—Oblon, Spivak, McClelland, Maier & Neustadt, P.C.

(57) ABSTRACT

A semiconductor integrated circuit of this invention includes a synchronous detection circuit which is given a playback signal generated by reading both first data recorded before recording to an optical disk is interrupted and second data recorded after the interruption, detects synchronization of the playback signal, and outputs a playback sync signal, and a sync signal phase measurement unit which is given the playback signal and playback sync signal, and measures and outputs a phase difference between those components corresponding to the first and second data, which are contained in the playback sync signal.

10 Claims, 8 Drawing Sheets

SEMICONDUCTOR INTEGRATED CIRCUIT, OPTICAL DISK RECORDING/PLAYBACK APPARATUS USING THE SAME, AND OPTICAL DISK RECORDING METHOD

CROSS REFERENCE TO RELATED APPLICATION

This application is based upon and claims benefit of priority from the prior Japanese Patent Application No. 2001-368102, filed on Dec. 3, 2001, the entire contents of which are incorporated herein by reference.

BACKGROUND OF THE INVENTION

The present invention relates to a semiconductor integrated circuit, an optical disk recording/playback apparatus using the same, and an optical disk recording method and, more particularly, to a semiconductor integrated circuit by which data recording to an optical disk can be restarted after once interrupted, an optical disk recording/playback apparatus using the same, and an optical disk recording method.

Only a guide groove for guiding a laser beam is formed on the substrate of, e.g., a recordable CD disk or DVD disk before recording. When this guide groove is irradiated with a laser beam subjected to data modulation so as to have high power, the reflection of a recording film changes. Accordingly, recording data such as audio data or video data can be recorded on an optical disk such as a CD or DVD. Also, the recorded data can be played back by using an optical disk playback apparatus.

To record data on an optical disk, an optical disk recording/playback apparatus of a personal computer or the like is used. FIG. 4 shows a personal computer 102 which includes a host CPU 106, buffer circuit 103, keyboard 104, hard disk 105, and the like, and an optical disk 101.

In the personal computer 102, data to be recorded on the optical disk 101 is once stored in the buffer circuit 103. The data stored in this buffer circuit 103 is sequentially recorded on the optical disk 101 at a predetermined rate.

When the data stored in the buffer circuit 103 is recorded on the optical disk 101, the next data is stored in the buffer circuit 103, and the stored data is recorded on the optical disk 101. This operation is repeated to record all data on the optical disk 101.

The host CPU 106, however, must control not only the storage of the data into the buffer circuit 103 but also the keyboard 104, harddisk 105, and the like, and must also perform various other control operations. Therefore, if these control operations and the operation of controlling data storage to the buffer circuit 103 are necessary, the load on the host CPU 106 increases.

Consequently, the rate at which data is transferred to the buffer circuit 103 lowers to make the storage of data in the buffer circuit 103 insufficient, and this interrupts recording to the optical disk 101. This phenomenon is called buffer under run. If this buffer under run occurs and recording is interrupted on, e.g., a CD-R (CD-Recordable) on which data can be recorded only once, this recording is terminated before completion. Since no data can be recorded after that, this CD-R must be discarded.

To avoid this event, the following recording method is used. That is, after recording to an optical disk is once interrupted, the end of recording data (to be referred to as "recorded data" hereinafter) already written on the optical disk immediately before the interruption is detected. Write of recording data (to be referred to as "additional data" hereinafter) to be recorded following the recorded data is started in an unrecorded area connecting to the end of the recorded data.

FIG. 5 shows the main components of a conventional optical disk recording/playback apparatus.

A laser pickup 107 plays back recorded data already written on an optical disk 101 before interruption and outputs an analog playback signal. The obtained playback signal is amplified by an RF amplifier 108, and A/D-converted, i.e., binarized by a binarizing circuit 109 included in a sampling circuit 102, thereby obtaining a digital playback signal.

A PLL circuit 110 performs sampling for this digital playback signal, and outputs the sampled playback data. This sampled playback data is supplied to a synchronous detection circuit 111 to generate a playback sync signal of the recorded data.

The sampled playback data is also supplied to a data demodulation circuit 112 to generate a sampling clock of the recorded data. The thus generated playback sync signal and sampling clock of the recorded data are supplied as recording timing data to a recording controller 113.

In accordance with this recording timing data, the recording controller 113 performs timing control for recording additional data. More specifically, the recording controller 113 gives a data modulator 114 a phase control signal containing information pertaining to a recording timing. By using recording data supplied from a buffer circuit 103, the data modulator 114 generates and outputs additional data at a timing corresponding to the phase control signal. The interrupted recording is restarted by recording this additional data on the optical disk 101 via a recording strategy 115, a laser driver 116, and the laser pickup 107.

As shown in FIG. 6, a delay time DELAY1 is produced by the playback signal processing from the timing at which the recorded data is picked up from the optical disk to the recording restart timing and to the playback data generation timing. This delay time DELAY1 includes a time delay1 required for the processing in the RF amplifier 103 and binarizing circuit 109, and a time delay2 required for the processing in the PLL circuit 110.

Also, as shown in FIG. 7, a delay time DELAY2 is produced by the recording signal processing from the timing at which the additional data is modulated to the timing at which the modulated data is written on the optical disk. This delay time DELAY2 includes a time delay3 required for the processing in the recording strategy 115, and a time delay4 required for the processing in the laser driver 116.

As shown in FIG. 8, offsets must be given to the playback signal detection timing, additional data generation timing, and recording restart timing by taking account of the delay times DELAY1+DELAY2 as described above. Hence, the optical disk recording/playback apparatus is designed by taking these offsets into consideration.

These offsets are controlled by measuring the delay times DELAY1+DELAY2 and matching the additional data generation timing with the recording restarting timing, in the stage of designing the optical disk recording/playback apparatus. The general method of matching is to once interrupt recording on an optical disk, and play back the connected portion in which additional data is recorded, thereby checking matching of the timings from, e.g., the waveform of the playback signal or the error rate of the playback data. Unfortunately, this method cannot accurately evaluate matching of the timings.

Also, the delay time delay1 shown in FIG. 6 and the delay time delay4 shown in FIG. 7 vary in accordance with the analog characteristics of individual devices and signal paths. That is, the delay time changes in accordance with, e.g., variations in the characteristics of individual devices and fluctuations in the operating temperature. Therefore, the additional data generation timing and the recording restart timing cannot be accurately controlled only by initial settings in the designing stage.

SUMMARY OF THE INVENTION

According to one aspect of the invention, a semiconductor integrated circuit comprises a synchronous detection circuit which is given a playback signal generated by reading both first data recorded before recording to an optical disk is interrupted and second data recorded after the interruption, detects synchronization of the playback signal, and outputs a playback sync signal, and a sync signal phase measurement unit which is given the playback signal and playback sync signal, and measures and outputs a phase difference between those components corresponding to the first and second data, which are contained in the playback sync signal.

According to one aspect of the invention, an optical disk recording/playback apparatus comprises a reading unit which outputs a playback signal by reading both first data recorded before recording to an optical disk is interrupted, and second data recorded after the interruption, a synchronous detection circuit which is given the playback signal, detects synchronization of the playback signal, and outputs a playback sync signal, and a sync signal phase measurement unit which is given the playback signal and playback sync signal, and measures and outputs a phase difference between those components corresponding to the first and second data, which are contained in the playback sync signal.

According to one aspect of the invention, an optical disk recording method comprises recording first data in a power calibration area of an optical disk, and writing second data after once interrupting the recording, generating a playback signal by reading both the first and second data, generating a playback sync signal by using the playback signal, and using the playback signal and playback sync signal to measure a phase difference between those components corresponding to the first and second data, which are contained in the playback sync signal.

According to another aspect of the invention, an optical disk recording method comprises generating a playback signal by reading, whenever data recording to an optical disk is interrupted, both first data recorded before the interruption and second data recorded after the interruption, generating a playback sync signal by using the playback signal, using the playback signal and playback sync signal to measure a phase difference between those components corresponding to the first and second data, which are contained in the playback sync signal, and if data recording to the optical disk is interrupted after third data is recorded, recording fourth data subsequently to the third data in accordance with a recording timing matching the phase difference.

DESCRIPTION OF THE PREFERRED EMBODIMENT

An embodiment of the present invention will be described below with reference to the accompanying drawings.

In an optical disk recording/playback apparatus according to this embodiment, if recording of recording data is interrupted, recorded data already written immediately before the interruption and additional data to be recorded immediately after the interruption can be connected with high accuracy while a connection difference is minimized, by using any of the following recording methods.

(1) In the stage of designing the optical disk recording/playback apparatus, recording data is written and, after the recording is once interrupted, recording data is written again, thereby measuring a connection timing difference intentionally produced between the recorded data and additional data, i.e., a difference between the phases of the recorded data and additional data. On the basis of the measurement result, the apparatus is so designed as to control the write timing of additional data, thereby optimizing the connection timing.

(2) After the optical disk recording/playback apparatus is shipped, recording data is written and, after the recording is once interrupted, recording data is written again, by using a power calibration area (PCA) normally formed in a central area near the center hole of an optical disk. A connection timing difference thus intentionally produced between the recorded data and additional data is measured. On the basis of the measurement result, the write timing of additional data is controlled if recording is interrupted while a user is writing data in a user area, thereby optimizing the connection timing.

(3) After the optical disk recording/playback apparatus is shipped, whenever recording is interrupted while a user is writing data in a user area and recording data is written again after that, a connection timing difference between the recorded data already written immediately before the interruption and the additional data written immediately after that is measured. In this manner, a connection timing difference is measured whenever interruption occurs. On the basis of the measurement result, the write timing of additional data is controlled after interruption occurs subsequently to the preceding interruption, thereby optimizing the connection timing.

Figure 1:
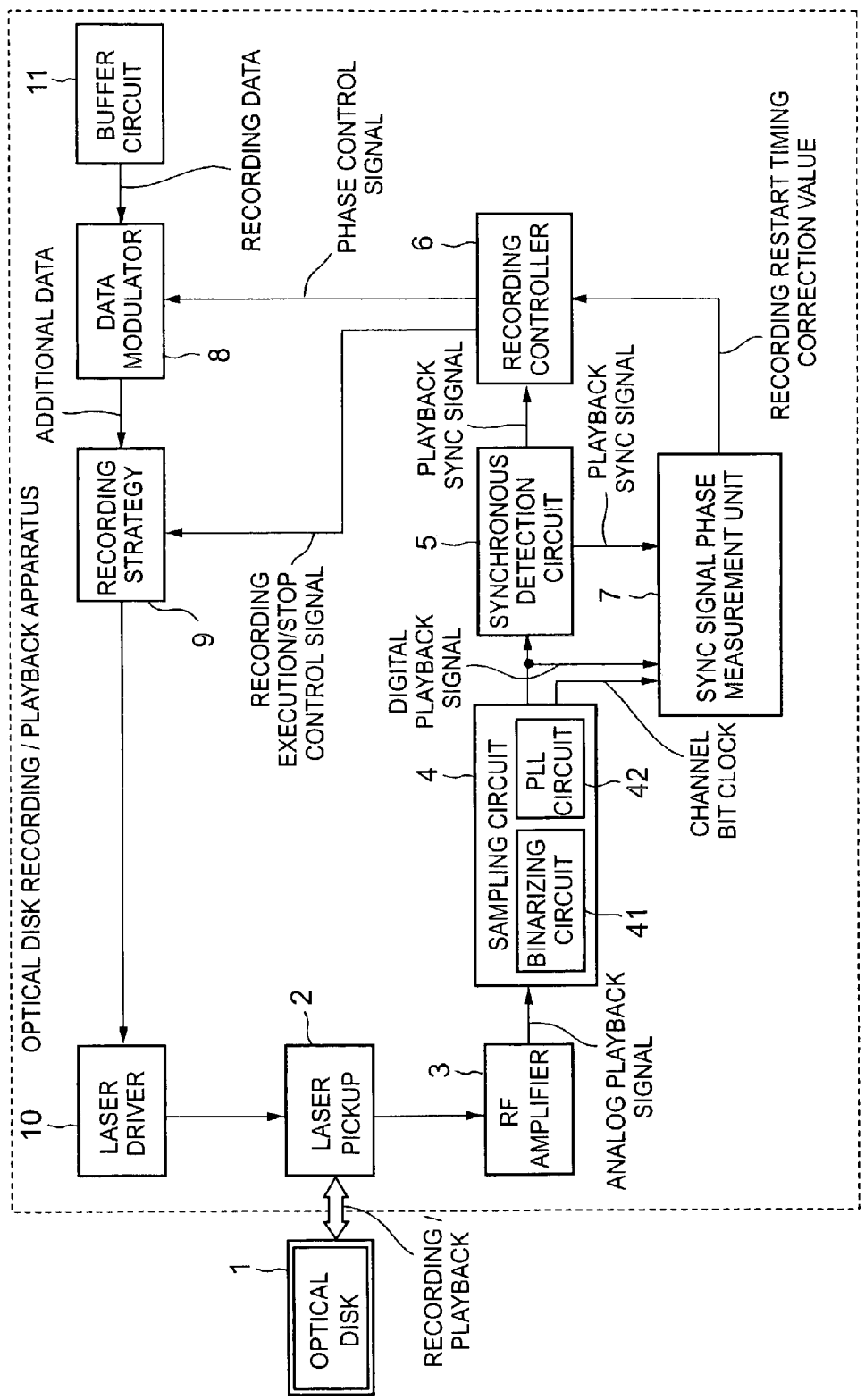
FIG. 1 is a block diagram showing the major parts of an optical disk recording/playback apparatus according to an embodiment of the present invention.

FIG. 1 shows the main parts of the optical disk recording/playback apparatus according to the embodiment of the present invention.

First, in a power calibration area or user area, a connection timing difference between recorded data written immediately before interruption occurs and additional data written after the interruption, i.e., a phase difference between a sync signal when the recorded data is played back and a sync signal when the additional data is played back is measured.

The recorded data and additional data written on an optical disk 1 are played back on the basis of changes in reflected light caused by diffraction of an output laser beam from a laser pickup 2. An RF amplifier 3 amplifies these data to generate an analog playback signal, and outputs this analog playback signal to a sampling circuit 4 including a binarizing circuit 41 and PLL circuit 42.

The analog playback signal is A/D-converted, i.e., binarized by the binarizing circuit 41, and output as a digital playback signal.

The PLL circuit 42 generates a channel bit clock, performs sampling for the digital playback signal by using this channel bit clock, and outputs the sampled playback signal. This sampled playback signal is given to a synchronous detection circuit 5 which generates a playback sync signal including a playback signal of the recorded data and a playback signal of the additional data. This playback sync signal is output to a sync signal phase measurement unit 7.

The sync signal phase measurement unit 7 is given this playback sync signal including the playback signal of the recorded data and the playback signal of the additional data, the sampled playback data output from the sampling circuit 4, and the channel bit clock.

As will be described later, the sync signal phase measurement unit 7 generates a correction value necessary to control the restart timing of recording of the additional data, and outputs this correction value to a recording controller 6.

This recording controller 6 is given the recording restart timing correction value output from the sync signal phase measurement unit 7, and the playback sync signal output from the synchronous detection circuit 5. The recording controller 6 generates a phase control signal for controlling a phase in order to control the restart timing of recording of the additional data, and outputs this phase control signal to a data modulator 8.

The data modulator 8 uses recording data supplied from a buffer circuit 11 to generate additional data at a timing matching the phase control signal, and outputs this additional data to a recording strategy 9. On the basis of a signal which is supplied from the recording controller 6 and which controls execution or stop of recording, the recording strategy 9 records the additional data on the optical disk 1 via a laser driver 10 and the laser pickup 2, thereby restarting the interrupted recording.

A semiconductor integrated circuit according to this embodiment includes the constituent elements shown in FIG. 1 except for the laser pickup 2 equivalent to a reader.

Figure 2A:
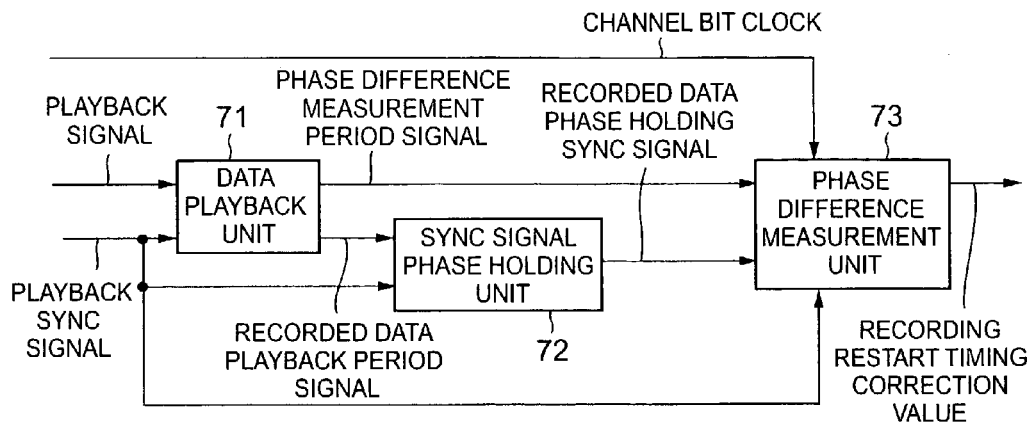
FIGS. 2A and 2B are block diagrams showing the arrangement of a sync signal phase measurement unit of the optical disk recording/playback apparatus.
Figure 3:
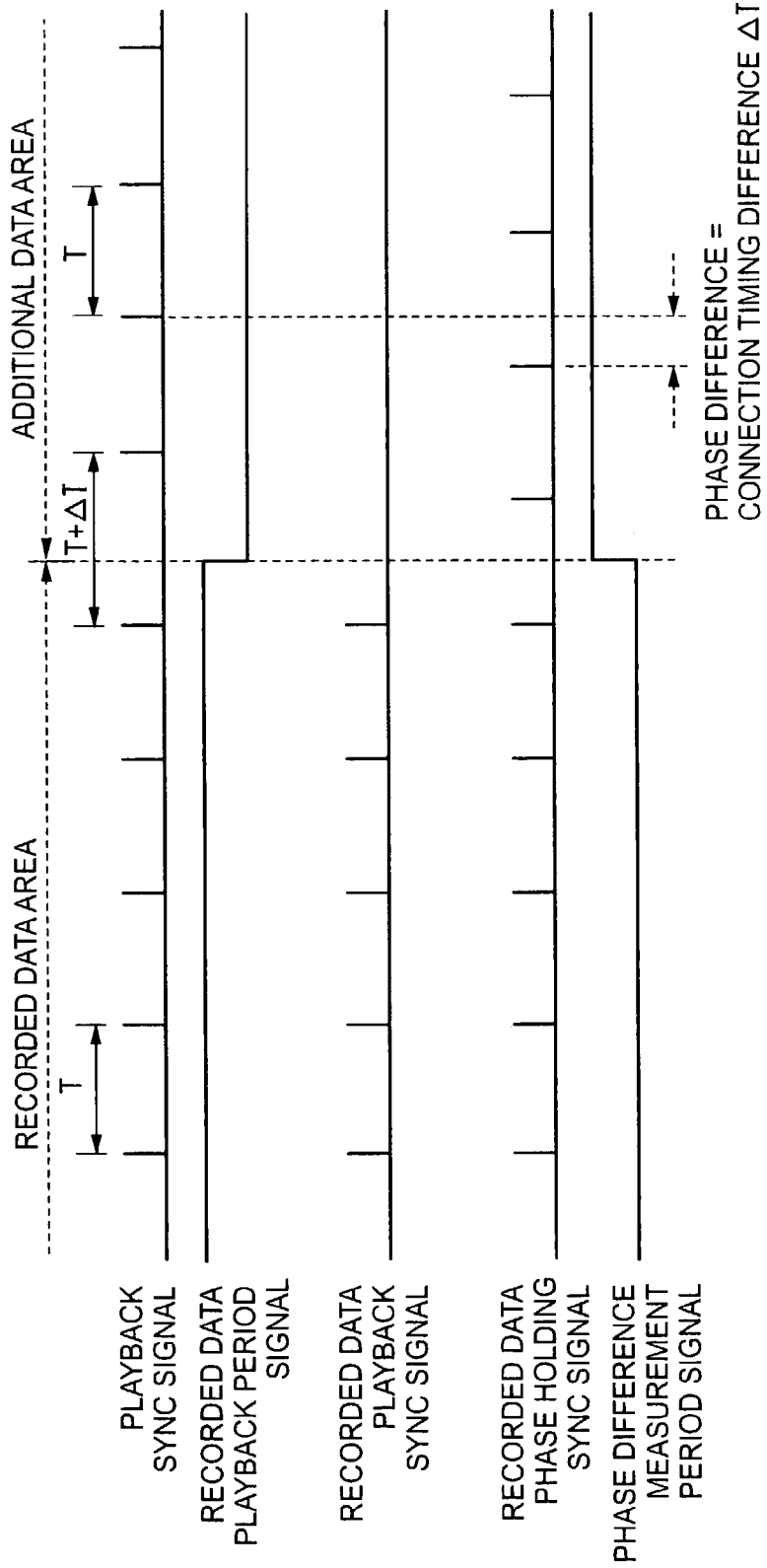
FIG. 3 is a timing chart showing the waveforms of signals in the sync signal phase measurement unit of the optical disk recording/playback apparatus.
Figure 4:
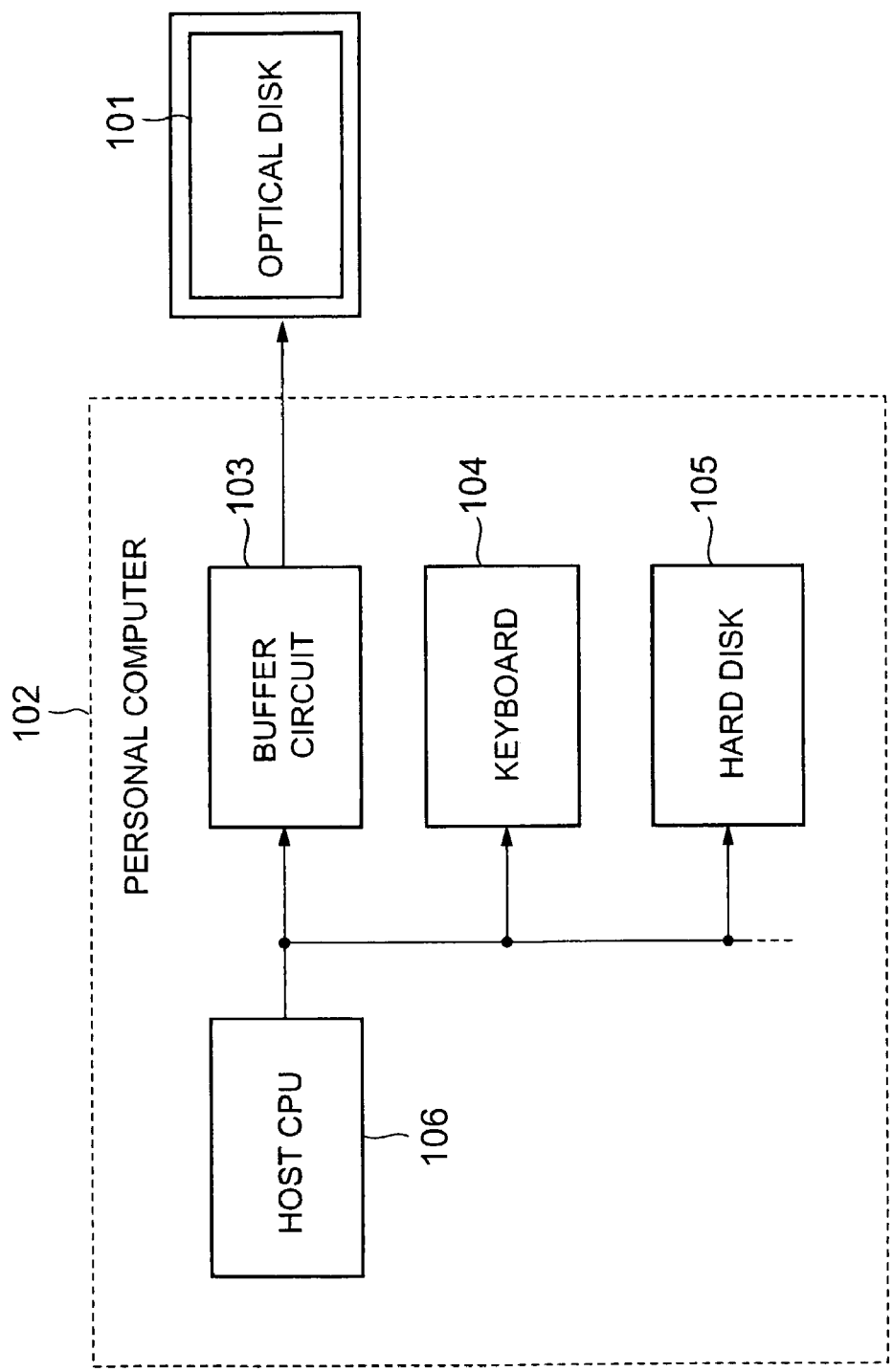
FIG. 4 is a block diagram showing a configuration when recording data is written on an optical disk by using an optical disk recording/playback apparatus contained in a personal computer.
Figure 5:
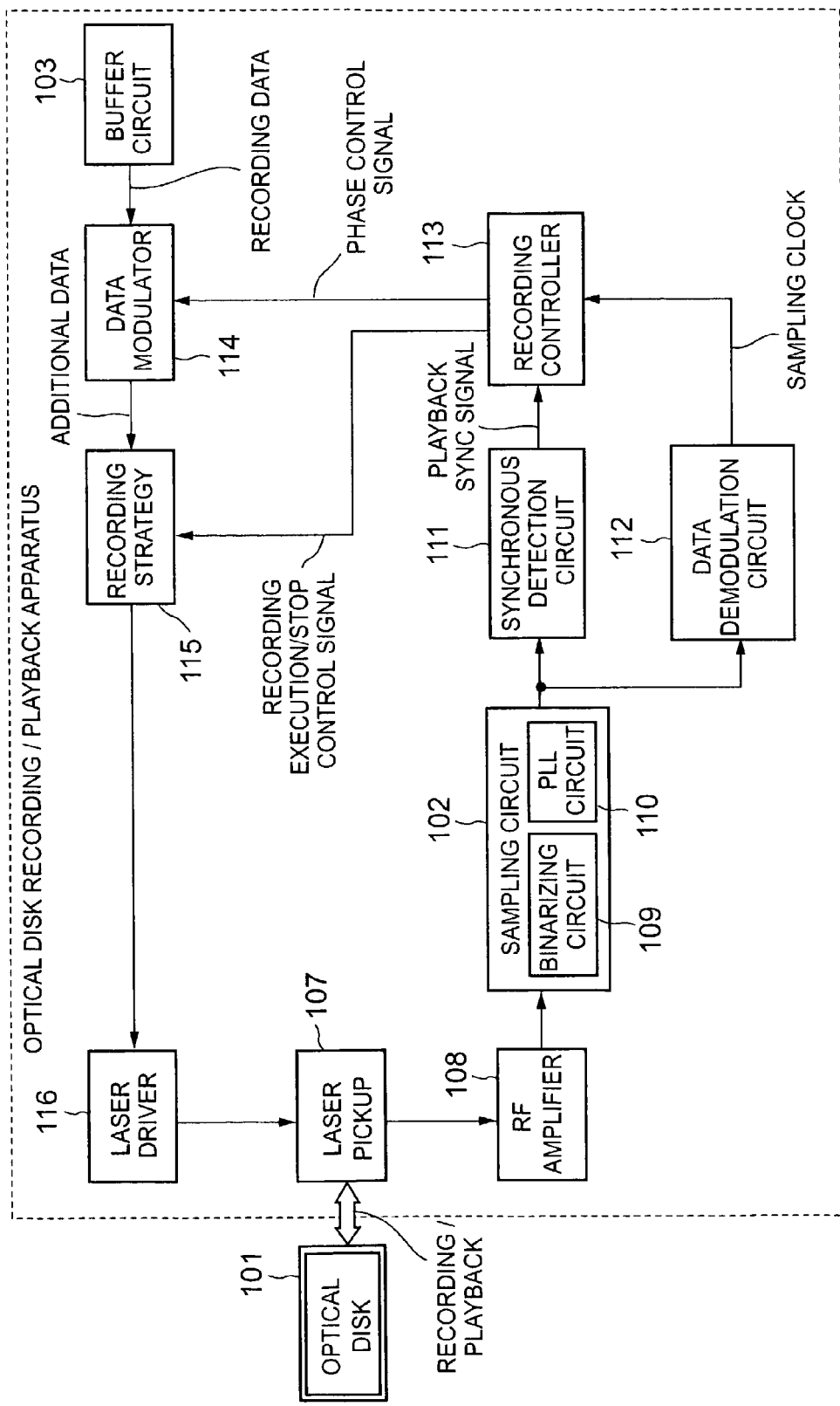
FIG. 5 is a block diagram showing the main components of a conventional optical disk recording/playback apparatus.
Figure 6:
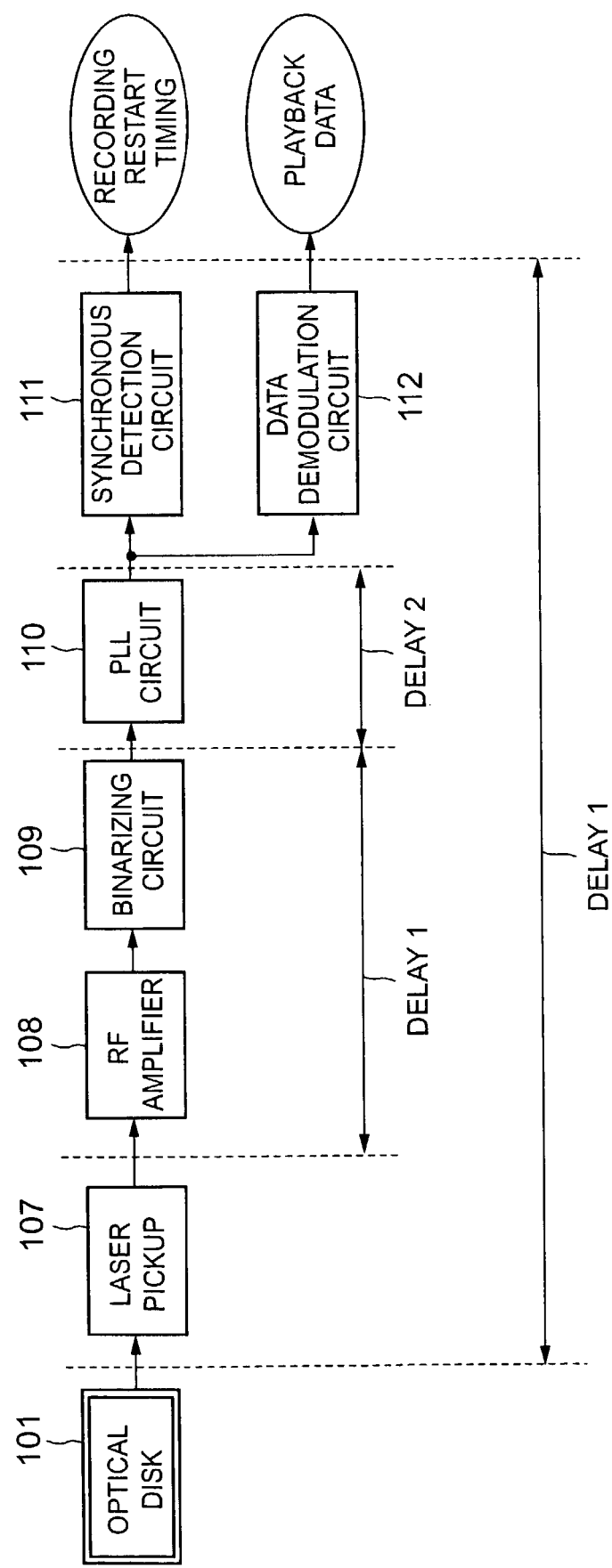
FIG. 6 is a view for explaining the procedure of processing data read from an optical disk in the optical disk recording/playback apparatus shown in FIG. 5.
Figure 7:
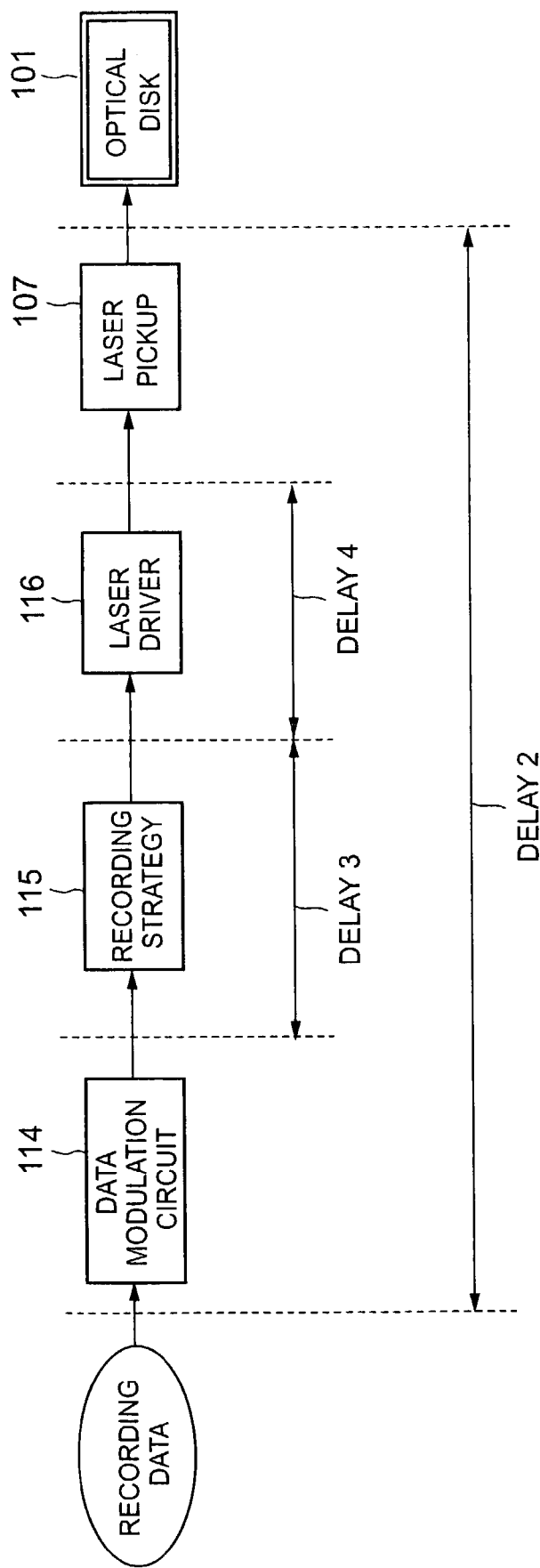
FIG. 7 is a view for explaining the procedure of writing recording data on an optical disk in the optical disk recording/playback apparatus shown in FIG. 5.
Figure 8:
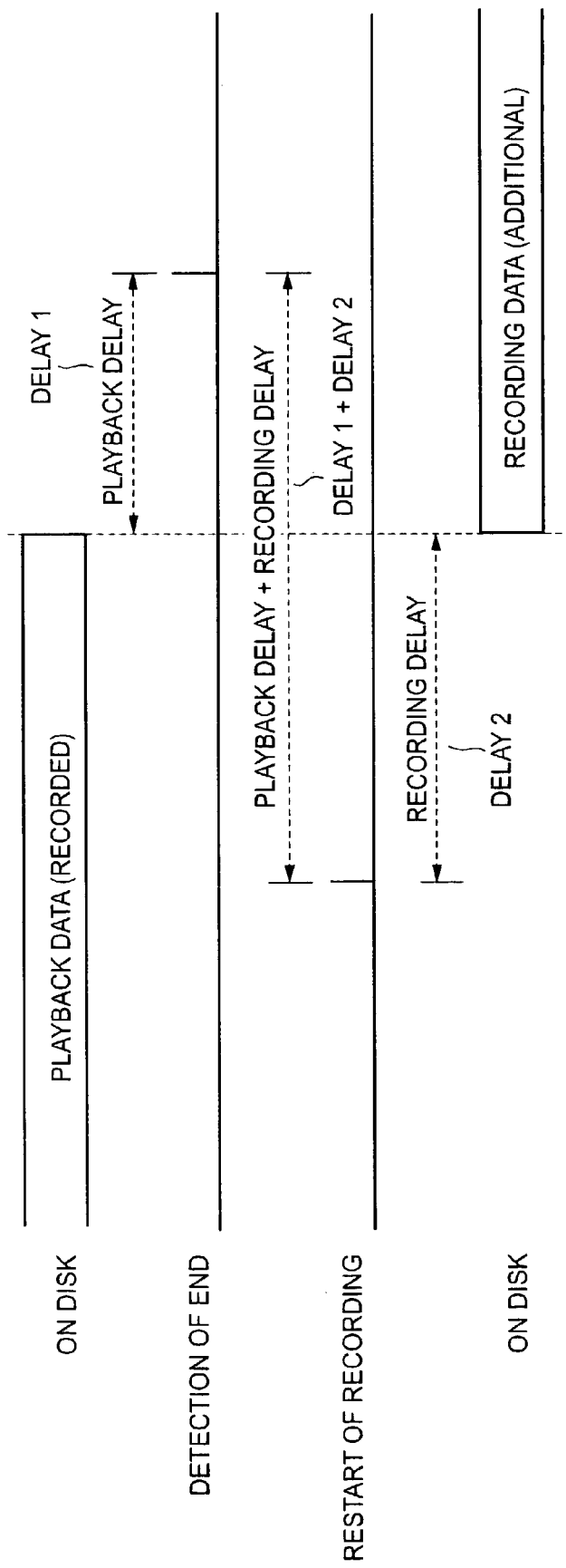
FIG. 8 is a view for explaining delay times which must be taken into consideration when timings are so controlled as to connect recorded data and additional data in the optical disk recording/playback apparatus shown in FIG. 5.

As shown in FIG. 2A, the sync signal phase measurement unit 7 has a data playback unit 71, sync signal phase holding unit 72, and phase difference measurement unit 73. FIG. 3 shows the waveforms of input and output signals in this sync signal phase measurement unit 7.

The playback sync signal output from the synchronous detection circuit 5 and the playback signal output from the sampling circuit 4 are input to the data playback unit 71. As shown in FIG. 3, the playback sync signal contains a playback sync signal in a recorded data area and a playback sync signal in an additional data area. A predetermined period T of the playback sync signal in the recorded data area is the same as a predetermined period T of the playback sync signal in the additional data area. However, a phase difference $\Delta T$ is present in a connecting portion between the recorded data area and additional data area.

The data playback unit 71 plays back time data contained in the playback signal to detect that position of the optical disk 1, which is currently being played back. By referring to a position at which recording is temporarily interrupted, the data playback unit 71 determines which of an area in which the recorded data is written or an area in which the additional data is written is being played back. On the basis of this determination result, the data playback unit 71 generates a recorded data playback period signal indicating the recorded data area and a phase difference measurement period signal indicating the additional data area.

The sync signal phase holding unit 72 is given the recorded data playback period signal and playback sync signal, and generates a playback sync signal, as a recorded data playback sync signal, which holds the predetermined period T of the playback sync signal in the recorded data area, over a region from the recorded data area to the additional data area, without being accompanied by the phase difference $\Delta T$. The sync signal phase holding unit 72 outputs this playback sync signal to the phase difference measurement unit 73.

Figure 2B:
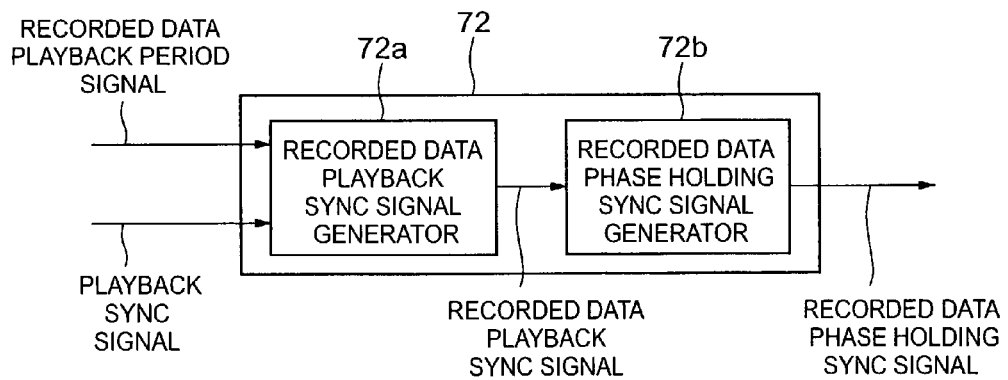

As illustrated in more detail in FIG. 2B, the sync signal phase holding unit 72 has a recorded data playback sync signal generator 72a and recorded data phase holding sync signal generator 72b.

The recorded data playback sync signal generator 72a is given the playback sync signal and recorded data playback period signal, extracts only a playback sync signal in the recorded data area indicated by the recorded data playback period signal, and outputs the extracted signal as a recorded data playback sync signal. This recorded data playback sync signal generator 72a may also be constructed by, e.g., an AND gate.

The recorded data phase holding sync signal generator 72b is given the recorded data playback sync signal, and generates a signal by which the predetermined period T of the recorded data playback sync signal is continuously held from the recorded data area to the additional data area without producing the phase difference $\Delta T$. The recorded data phase holding sync signal generator 72b outputs this signal as a recorded data phase holding sync signal.

This recorded data phase holding sync signal and the playback sync signal are supplied to the phase difference measurement unit 73 which measures a phase difference, i.e., a connection timing difference $\Delta T$ between the two signals in the additional data area. The phase difference measurement unit 73 outputs this difference as a value $\Delta T$ for correcting the restart timing of recording.

The accuracy of this recording restart timing correction value $\Delta T$ depends upon the operating clock of the phase difference measurement unit 73. When the channel bit clock output from the PLL circuit 42 included in the sampling circuit 4 is used as this operating clock, the phase difference detection accuracy can be suppressed to ± one channel bit or less. In this case, the recording restart timing correction value $\Delta T$ is expressed by the number of channel bit clocks.

For example, the standard concerning a CD disk defines that the predetermined period T of the playback sync signal has 588 channel bit clocks. Therefore, the correction value $\Delta T$ can also be represented by the number of channel bit clocks. By thus expressing the recording restart timing correction value $\Delta T$ by the number of channel bit clocks, this correction value $\Delta T$ can be measured with high accuracy while predetermined quality is maintained.

The recording controller 6 is given the recording restart timing correction signal $\Delta T$ and playback sync signal, generates a phase control signal for controlling a phase when additional data is to be written, and outputs this phase control signal to the data modulator 8. This recording controller 6 also generates a recording execution/stop control signal for controlling execution and stop of recording of additional data, and outputs the signal to the recording strategy 9.

The data modulator 8 is given recording data to be written next, which is stored in the buffer circuit 11. At a timing corresponding to the phase control signal, the data modulator 8 outputs additional data to the recording strategy 9. At a timing corresponding to the recording execution/stop control signal, the recording strategy 9 outputs the additional data to the laser driver 10. Consequently, at a timing set by taking the correction value $\Delta T$ into consideration, the additional data is written on the optical disk 1 via the laser driver 10 and laser pickup 2.

In this embodiment, a phase difference $\Delta T$ between the end of recording data written immediately before interruption occurs and the start of recording data written immediately after the interruption is measured as a connection timing difference. If interruption occurs after that, the end of recorded data written immediately before this interruption and the start of additional data to be written next can be connected with high accuracy, by taking the aforementioned phase difference $\Delta T$ into consideration, such that the connection timing difference is minimized.

Accordingly, compared to the conventional method in which connection timings are adjusted on the basis of the waveform of a playback signal or the error rate of playback data, the end of recorded data and the start of additional data can be connected with high accuracy by taking account of differences between the characteristics of individual optical disks or differences between the characteristics of individual devices in the apparatus.

In the present invention, any of the three recording methods described earlier can be selected.

In the first recording method, in the stage of designing the optical disk recording/playback apparatus, recording data is written and, after the recording is once interrupted, recording data is written again. In this way, a phase difference $\Delta T$ is intentionally produced between the recorded data and additional data, and measured. If interruption occurs while a user is writing data after the product is shipped, additional data can be accurately connected to the recorded data on the basis of the result of the measurement.

In the second recording method, after the apparatus is shipped, recording data is written and, after the recording is once interrupted, recording data is written again, by using a power calibration area of an optical disk, thereby measuring an intentionally produced phase difference $\Delta T$. If interruption occurs while a user is writing data in a user area, additional data is accurately connected to the recorded data on the basis of the result of the measurement.

In the third recording method, after the apparatus is shipped, whenever interruption occurs while a user is writing data in a user area and recording data is written after that, a phase difference $\Delta T$ between the recorded data written immediately before the interruption and the additional data written immediately after the interruption is measured. If interruption occurs while the user is writing data after that, additional data is accurately connected to the recorded data on the basis of the result of the measurement.

When this third recording method is used, it is possible to measure the phase difference $\Delta T$ between recorded data and additional data for each optical disk, and connect the additional data to the recorded data at an optimum timing suited to the characteristics of the optical disk.

Also, even when interruption occurs a plurality of number of times while data is recorded on one optical disk, additional data can be connected to the recorded data whenever interruption occurs, by reflecting the result of measurement of the phase difference $\Delta T$ between the recorded data and additional data.

What is claimed is:

1. A semiconductor integrated circuit comprising:
   a synchronous detection circuit which is given a playback signal generated by reading both first data recorded before recording to an optical disk is interrupted and second data recorded after the interruption, detects synchronization of the playback signal, and outputs a playback sync signal; and
   a sync signal phase measurement unit which is given the playback signal and playback sync signal, and measures and outputs a phase difference between components corresponding to the first and second data, which are included in the playback sync signal,
   wherein said sync signal measurement unit comprises:
   a data playback unit which is given the playback signal output from a reading unit and the playback sync signal output from said synchronous detection circuit, and generates a first data playback period signal indicating a period corresponding to the first data in the playback sync signal, and a second data playback period signal indicating a period corresponding to the second data in the playback sync signal;
   a sync signal phase holding unit which is given the playback sync signal and first data playback period signal, extracts a component contained in the period corresponding to the first data in the playback sync signal, and outputs a first data phase holding sync signal which holds the phase of the extracted component from the period corresponding to the first data to the period corresponding to the second data; and
   a phase difference measurement unit which is given the playback sync signal, second data playback period signal, and first data phase holding sync signal, and measures and outputs a phase difference between the first data phase holding sync signal and a component of the period corresponding to the second data in the second data playback period signal.

2. A circuit according to claim 1, wherein said sync signal phase holding unit comprises:
   a first data playback sync signal generator which is given the playback sync signal and first data playback period signal, extracts the component contained in the period corresponding to the first data in the playback sync signal, and generates a first data playback sync signal; and
   a first data phase holding sync signal generator which generates a first data phase holding sync signal which holds the phase of the first data playback sync signal from the period corresponding to the first data to the period corresponding to the second data.

3. A circuit according to claim 1, further comprising
a recording unit which is given the phase difference output from said sync signal phase measurement unit and, after recording third data on said optical disk and interrupting the recording, records fourth data on said optical disk in accordance with a recording timing matching the phase difference.

4. A circuit according to claim 1, wherein
a reading unit generates and outputs a channel bit clock necessary to generate the playback signal, and
said sync signal phase measurement unit measures the phase difference for each channel bit clock.

5. An optical disk recording/playback apparatus comprising:
a reading unit which outputs a playback signal by reading both first data recorded before recording to an optical disk is interrupted, and second data recorded after the interruption;
a synchronous detection circuit which is given the playback signal, detects synchronization of the playback signal, and outputs a playback sync signal; and
a sync signal phase measurement unit which is given the playback signal and playback sync signal, and measures and outputs a phase difference between components corresponding to the first and second data, which are included in the playback sync signals,
wherein said reading unit comprises: a laser pickup which irradiates said optical disk with a laser beam and, on the basis of a change in the obtained reflected light, outputs an analog playback signal including the first and second data, and said optical disk recording/playback apparatus further comprises:
a binarizing circuit which is given the analog playback signal and binarizes the analog playback signal to output a digital playback signal; and
a PLL circuit which is given the digital playback signal to generate a channel bit clock, and performs sampling for the digital playback signal by using the channel bit clock, thereby outputting the playback signal, and wherein
said sync signal phase measurement unit comprises:
a data playback unit which is given the playback signal output from said reading unit and the playback sync signal output from said synchronous detection circuit, and generates a first data playback period signal indicating a period corresponding to the first data in the playback sync signal, and a second data playback period signal indicating a period corresponding to the second data in the playback sync signal;
a sync signal phase holding unit which is given the playback sync signal and first data playback period signal, extracts a component included in the period corresponding to the first data in the playback sync signal, and outputs a first data phase holding sync signal which holds the phase of the extracted component from the period corresponding to the first data to the period corresponding to the second data; and
a phase difference measurement unit which is given the playback sync signal, second data playback period signal, and first data phase holding sync signal, and measures and outputs a phase difference between the first data phase holding sync signal and a component of the period corresponding to the second data in the second data playback period signal.

6. An apparatus according to claim 5, wherein said sync signal phase holding unit comprises:
a first data playback sync signal generator which is given the playback sync signal and first data playback period signal, extracts the component included in the period corresponding to the first data in the playback sync signal, and generates a first data playback sync signal; and
a first data phase holding sync signal generator which generates a first data phase holding sync signal which holds the phase of the first data playback sync signal from the period corresponding to the first data to the period corresponding to the second data.

7. An apparatus according to claim 5, further comprising
a recording unit which is given the phase difference output from said sync signal phase measurement unit and, after recording third data on said optical disk and interrupting the recording, records fourth data on said optical disk in accordance with a recording timing matching the phase difference.

8. An apparatus according to claim 5, wherein
said reading unit generates and outputs a channel bit clock necessary to generate the playback signal, and
said sync signal phase measurement unit measures the phase difference for each channel bit clock.

9. An optical disk recording method comprising:
recording first data in a power calibration area of an optical disk, and writing second data after once interrupting the recording;
generating a playback signal by reading both the first and second data;
generating a playback sync signal by using the playback signal;
using the playback signal and playback sync signal to measure a phase difference between components corresponding to the first and second data, which are included in the playback sync signal; and
recording third data on the optical disk and, after once interrupting the recording, recording fourth data on the optical disk in accordance with a recording timing matching the phase difference.

10. An optical disk recording method comprising:
generating a playback signal by reading, whenever data recording to an optical disk is interrupted, both first data recorded before the interruption and second data recorded after the interruption;
generating a playback sync signal by using the playback signal;
using the playback signal and playback sync signal to measure a phase difference between components corresponding to the first and second data, which are included in the playback sync signal; and
if data recording to the optical disk is interrupted after third data is recorded, recording fourth data subsequently to the third data in accordance with a recording timing matching the phase difference.

* * * * *